United States Patent [19]

Cheng et al.

[11] 4,027,379
[45] June 7, 1977

[54] METHOD OF INSULATING CRYOGENIC VESSELS

[75] Inventors: Chin Huan Cheng; Burton D. Brubaker, both of Midland, Mich.

[73] Assignee: The Dow Chemical Company, Midland, Mich.

[22] Filed: Dec. 23, 1974

[21] Appl. No.: 535,248

Related U.S. Application Data

[62] Division of Ser. No. 370,242, June 15, 1973, abandoned.

[52] U.S. Cl. ............................ 29/455 R; 29/460;
62/DIG. 13; 62/45; 220/9 LG
[51] Int. Cl.² .................. B21D 39/00; B23P 19/04
[58] Field of Search ......... 29/460, 455; 113/120 A; 62/45, DIG. 13; 220/9 LG, 10; 114/74 A

[56] References Cited

UNITED STATES PATENTS

| | | |
|---|---|---|
| 3,018,016 | 1/1962 | Hnilicka .............................. 220/10 |
| 3,122,891 | 3/1964 | Thomas ....................... 62/DIG. 13 UX |
| 3,130,561 | 4/1964 | Hnilicka ...................... 220/9 LG X |
| 3,257,265 | 6/1966 | Isenberg ...................... 220/9 G UX |
| 3,304,728 | 2/1967 | DeHaan .................................. 62/45 |

FOREIGN PATENTS OR APPLICATIONS

| | | |
|---|---|---|
| 683,855 | 12/1952 | United Kingdom ............ 220/9 LG |
| 975,265 | 11/1964 | United Kingdom .......... 62/DIG. 13 |

*Primary Examiner*—Charlie T. Moon
*Attorney, Agent, or Firm*—R. B. Ingraham

[57] ABSTRACT

Cryogenic vessels having improved insulation value are prepared by incorporating evacuated tubing within the insulation.

6 Claims, 1 Drawing Figure

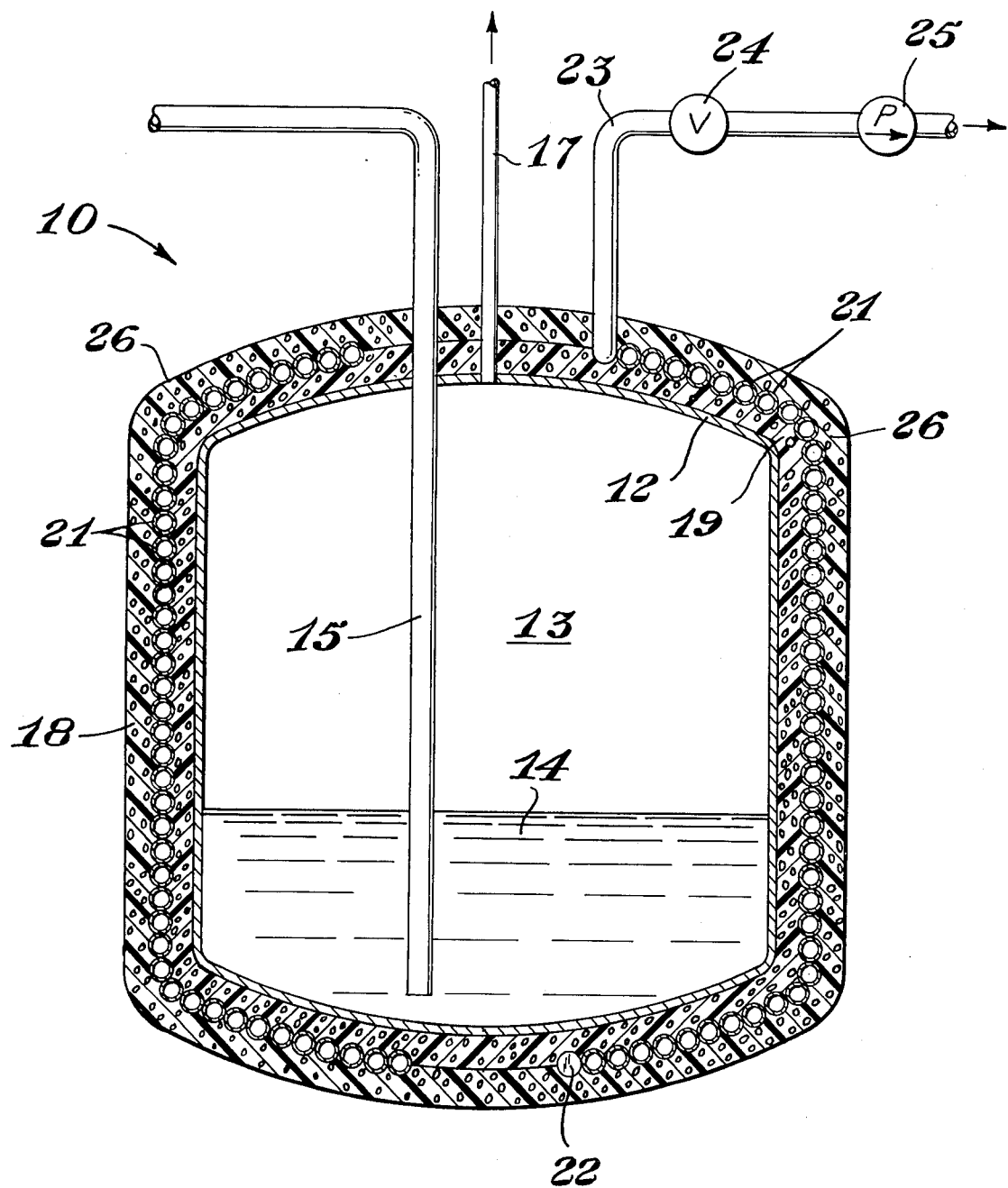

METHOD OF INSULATING CRYOGENIC VESSELS

CROSS-REFERENCE TO RELATED APPLICATION

This is a division of application Ser. No. 370,242 filed June 15, 1973, now abandoned.

Many modes of insulation for cryogenic vessels are known. Many of them are remarkably efficient and many of them are also remarkably expensive. Cryogenic liquids have become increasingly important, and desirably, cryogenic vessels have become larger. It is desirable that such vessels be insulated with minimal effort and minimal expense and that such insulation provide maximum durability. Synthetic resinous or plastic foams are widely employed for the insulation of cryogenic vessels due to their low cost and to the fact that they are readily fabricated in a variety of shapes. Such plastic foam may be cast in place, such as the polyurethane foams, or may be supplied in the form of planks, billets, boards or the like as is the case with foam such as polystyrene foam.

It would be desirable if the efficiency of such insulation could be increased in an inexpensive manner.

This benefit and other advantages in accordance with the present invention are achieved in a cryogenic vessel, the cryogenic vessel defining a liquid-receiving cavity and an insulating layer, the insulating layer being of a material of generally low thermal conductivity, the improvement which comprises incorporating within the insulating layer a layer of tubing, the tubing containing a gas under a pressure not greater than one millimeter of mercury absolute.

Also contemplated within the scope of the present invention is a method for the formation of a cryogenic vessel, the steps of the method comprising providing a vessel, applying thermal insulation thereto, the improvement which comprises incorporating tubing within at least a portion of the insulation, the tubing containing a gas at an absolute pressure not greater than about one millimeter of mercury absolute.

Further features and advantages of the present invention will become more apparent from the following specification taken in connection with the drawing wherein:

The FIGURE depicts a vessel in accordance with the present invention.

In the FIGURE there is depicted a vessel generally designated by the reference numeral 10. The vessel 10 is shown in section and comprises in cooperative combination a liquid containment shell 12 defining therein a cryogenic liquid-receiving cavity 13 having disposed therein a cryogenic liquid 14. A first conduit or dip tube 15 extends into the shell 12 and terminates in an open end generally adjacent the lower part of the vessel. A second or vent conduit 17 is in communication with the cavity 13 generally adjacent the uppermost portion thereof. The shell 12 is surrounded with an insulation layer 18. The layer 18 comprises a first portion of thermal insulation 19 disposed immediately adjacent the outer surface of the shell 12. Beneficially, the insulation 19 is cellular synthetic resinous foam of closed cell variety. Immediately adjacent the insulation 19 is a layer of thin wall tubing 21. The tubing 21 is generally helically spirally disposed about a major portion of the insulation 19. The tubing 21 has a closed end 22 and an open end 23 in operative combination with a valve 24 which is in turn in communication with a vacuum pump 25. The tubing layer 21 is in turn surrounded by a second or outermost layer 26 of thermal insulation, beneficially of like composition to that of the layer 19. Beneficially, the tubing 21 is evacuated through the valve 24 by the pump 25 until gas within the tubing is at a pressure not greater than one millimeter of mercury, and preferably not greater than 0.5 millimeter of mercury.

Vessels in accordance with the present invention are readily fabricated by conventional fabrication means. Insulation such as the insulation 19 can be of closed cell synthetic resinous foam, open cell synthetic resinous foam, glass fiber batts, foamed-in-place synthetic resinous foam and the like. The tubing such as the tubing 21 desirably is of thin wall; that is, a structure wherein the ratio of the diameter to the wall thickness is 20 or more. The tubing may be metal or plastic. However, the ratio of the yield strength or working strength in pounds per square inch to the thermal conductivity expressed in British thermal units (inches/hour per square foot/° F.) should be 100 or greater, and most advantageously this ratio should exceed 1000. Typical ratios for a variety of material are set forth in the table which follows.

| MATERIAL | S YIELD STRENGTH OR WORKING STRENGTH[1] | K THERMAL CONDUCTIVITY[2] | S:K |
|---|---|---|---|
| 304 stainless steel | 35,000 | 113 | 310 |
| 5083 aluminum alloy | 22,000 | 809 | 27 |
| soda/lime glass | 1000 | 6.4 | 156 |
| nylon 6 | 11,000 ± 1000 | 1.44 ± 0.24 | 7640 |
| high density polyethylene | 4500 ± 1000 | 2.28 | 1970 |
| polystyrene GP | 6700 ± 1800 | 0.83 | 8090 |
| rigid PVC & saran | 7200 ± 1800 | 1.02 | 7060 |
| polycarbonate | 9700 ± 8000 | 1.32 | 7350 |

FOOTNOTES:
[1] pounds per square inch
[2] British thermal units - inches/hour/ft$^2$-° F.

For most applications where the tubing is wound about the vessel and is not adhered to the insulation, the tubing alone must resist an external pressure of about atmospheric pressure. However, it is oftentimes desirable to incorporate the tubing within a matrix and adhere the tubing to the matrix. Beneficially, a wide variety of adhesives may be employed such as the room temperature vulcanizing silicone resins, epoxy resins, polyurethane resins and the like. Such adhesives are well known and are commercially available. (See The Encyclopedia of Polymer Science, Vol. 4, page 434, which describes a variety of adhesives suitable for cryogenic applications.)

One particularly beneficial manner or preparing such vessels is to employ foaming-in-place polyurethane resins and encapsulating the tubing within the resin as resin and tubing are deposited about the periphery of the vessel, the tubing being applied as one or more layers.

By way of further illustration, a jacketed vessel in accordance with the present invention is prepared in the following manner: a 1 gallon open topped sheet steel container (a gallon paint can) measuring about 6.5 inches in diameter and 7.5 inches in height is insulated by surrounding the can with a polystyrene foam jacket having a thickness of 3 inches. Liquid nitrogen is introduced into the vessel and the weight of the insulated vessel and contents is recorded at various time intervals. Subsequently, a portion of the polystyrene foam is removed and replaced about the cylindrical portion of the container with a layer of plastic tubing helically wound. The plastic tubing is vinylidene chloride polymer and has a diameter of about 3/8 inch and a wall thickness of about 35 mils. One end of the tubing is closed, the remaining end is attached to a vacuum pump and evacuated to a pressure of about 0.1 millimeter of mercury and the weight loss of the container again recorded over differing periods of time. After a period of 350 minutes, the container when insulated with only polystyrene has lost about 1.31 kilograms, while the container with evacuated tubing included within the insulation over a like period of time lost only about 1.02 kilograms.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the formation of a cryogenic vessel, the steps of the method comprising providing a vessel, applying thermal insulation thereto, the improvement which comprises incorporating tubing within at least a portion of the insulation, the tubing containing a gas at an absolute pressure not greater than about one millimeter of mercury absolute, the tubing containing the gas thereby providing improved thermal insulation of the vessel.

2. The method of claim 1 wherein the thermal insulation is plastic foam.

3. The method of claim 1 wherein the tubing has a yield strength S in pounds per square inch and a thermal conductivity K in British thermal units (inches/hour/square foot/° F.) and the ratio of S:K is at least 100.

4. The method of claim 3 wherein the ratio of S:K is at least 1000.

5. The method of claim 1 wherein the tubing is a plastic tubing.

6. The method of claim 5 wherein the plastic tubing is adhered to the thermal insulation and the thermal insulation is a plastic foam.

* * * * *